Jan. 18, 1966    S. B. MATHESON    3,229,316
COMBINED SCRAPER AND STANDARD
Filed Sept. 30, 1963
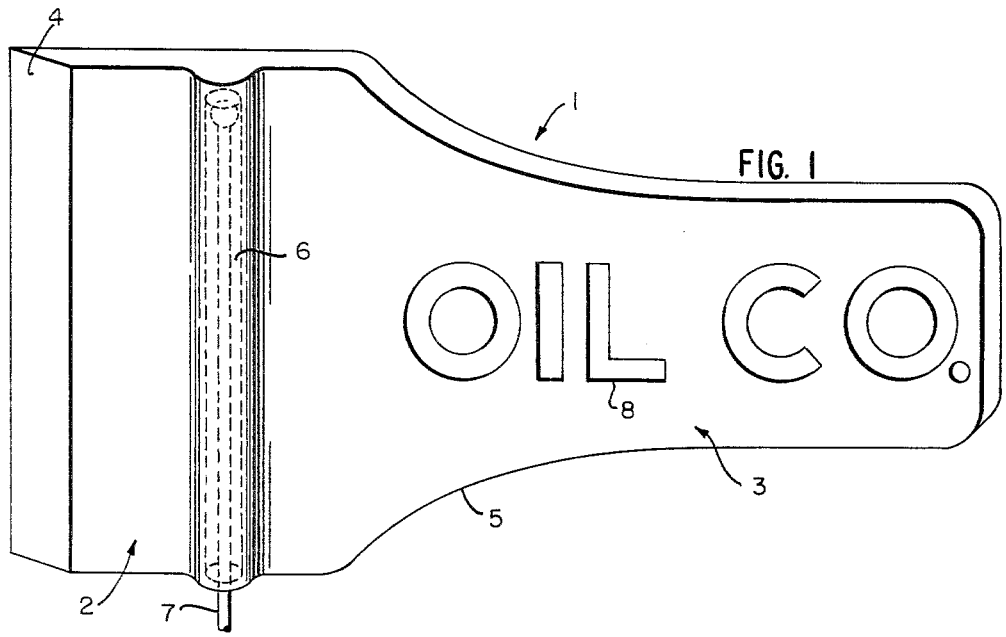
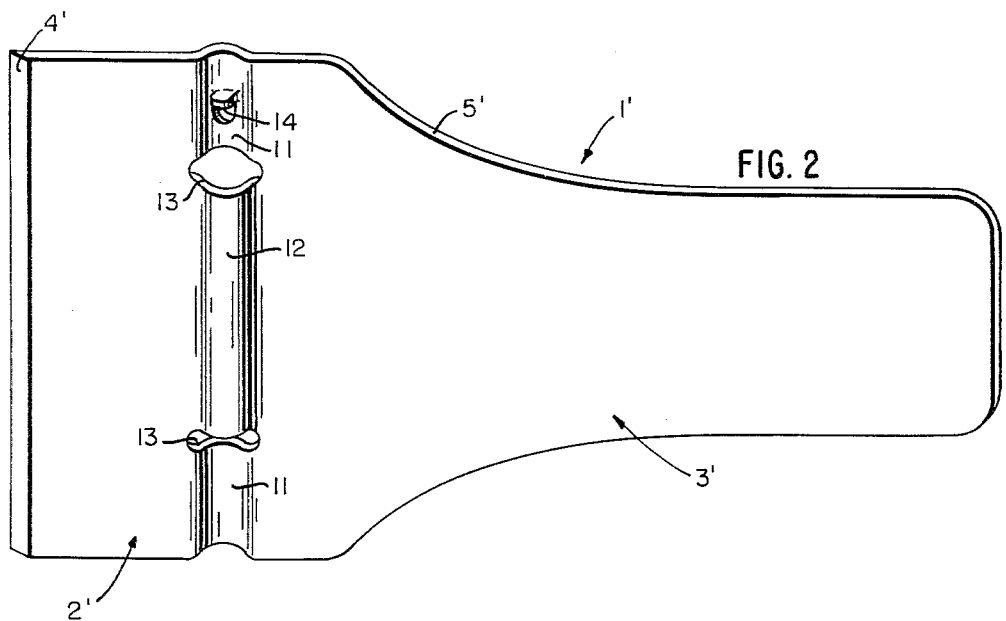
INVENTOR.
STUART B. MATHESON
BY
ATTORNEYS 3,229,316
COMBINED SCRAPER AND STANDARD
Stuart B. Matheson, Needham, Mass., assignor of one-half to Peirce Fuller, Norwell, Mass.
Filed Sept. 30, 1963, Ser. No. 312,763
6 Claims. (Cl. 15—105)

This invention relates to a combined scraper and standard.

An object of the invention is to provide a combined scraper and standard adapted for use on an automobile both to scrape ice from the windows and to locate the automobile in a crowded parking lot. A further object is to provide a combined scraper and standard of a construction simple enough that it may be inexpensively formed and freely distributed to customers as a favor. These and other objects of the invention will become apparent from the following description of a preferred embodiment.

The combined scraper and standard in general comprises a base plate having a blade at one end and a handle at the other, and formed with an elongated pocket. The opposed blade and handle form a scraper, while the elongated pocket adapts the scraper to be mounted on the outer end portion of an automobile antenna to serve as a standard to aid in spotting a parked automobile from a distance. Preferably the elongated pocket of the combined scraper and standard is offset from the center of area of the base plate, and extends substantially through the center of gravity of the base plate. Thus, when it is mounted on an automobile antenna, it will face into the wind and will exert little if any bending force on the antenna either due to its own weight or to the forces of deflection exerted by the wind. This minimizes any flexing of the automobile antenna, which in turn would tend to throw off the combined scraper and standard. In one of the illustrated embodiments, the elongated pocket comprises an opening formed in the base plate, while in the other illustrated embodiment, the elongated pocket comprises aligned depressed and raised portions formed in the base plate with openings between the deformed portions, and a tab extending substantially across the elongated pocket at one end thereof.

The invention will be further described in connection with the accompanying drawings in which:

FIGURE 1 is a view in perspective of one embodiment of the combined scraper and standard; and FIGURE 2 is a view in perspective of another embodiment of the combined scaper and standard.

The combined scraper and standard includes a base plate 1 having a blade portion 2 and a handle portion 3. The blade portion includes a blade 4 formed at one end portion of the base plate. One side of the blade is a continuation of the face of the base plate, as illustrated, so that the base plate during scraping may be placed almost on the surface being scraped to minimize the force urging the blade into the surface. The blade portion is substantially wider than the handle portion to provide both a large scraping blade and also a handle which is small enough to be comfortable to grip. Also, the sides of the handle portion gradually curve and blend into the sides of the blade portion, as indicated at 5 at arcuate sides 5 so that, when the handle is gripped, the thumb and forefinger will lie along the arcuate sides and exert a force on the scraper having a longitudinal component perpendicular to the blade. Because of this, the scraping force is exerted both by the thumb and the forefinger as well as by the palm of the hand extending about the end of the handle, and thus the scraping force is fairly evenly distributed between the thumb, forefinger, and palm of the hand, rather than being concentrated in the palm of the hand. While the scraper is of general utility, it is preferred to employ it to scrape ice and snow from windows, particularly automobile windows.

As shown in FIGURE 1, the blade portion of the base plate includes an enlarged portion, comprising a raised hollow ridge 6, which extends generally parallel to the edge of the blade 4. The top end of the ridge 6 is closed while the lower end is open, forming an elongated, straight, generally cylindrical pocket within the ridge for receiving the outer end portion of an automobile antenna 7, the ball normally formed at the outer tip of the automobile antenna bearing against the inner surface of the closed end of the boss. When the combined scraper and standard is so mounted on an automobile antenna, it will aid in spotting an automobile in a crowded parking lot.

Preferably the center of area of the finished combined scraper and standard is offset from its center of gravity. Should the center of area and center of gravity coincide, it would have a tendency to flutter excessively in the wind. By displacing the center of gravity from the center of area, fluttering is minimized, and the unit tends to face into the wind at all times. The enlarged mass provided on the combined scraper and standard by the ridge 6 performs this function, the center of gravity moving from the center of area towards the ridge. By appropriately shaping the combined scraper and standard as generally illustrated in FIGURE 1, the center of gravity can be made to substantially coincide with the elongated pocket formed in the ridge 6 to center the weight of the unit on the automobile antenna. By this construction, the combined scraper and standard will tend to face into the wind at all times, and will not exert a bending force on the antenna either due to its own weight alone or to the forces of deflection exerted by the wind. This minimizes any flexing of the antenna which would tend to bend the antenna and throw the unit off.

Preferably the combined scraper and standard is brightly colored, as for example with what is known as fluorescent orange, so that when mounted on an automobile antenna it may be seen from afar to serve as a standard locating the parked automobile. Because of the simplicity of construction, the combined scraper and standard may be formed of a unitary plastic construction, which is preferred, to materially reduce the cost of the finished product and result in a unit which is inexpensive enough to be freely distributed to customers as a favor. Particularly in this connection, advertising matter 8 may be impressed on or formed in the base plate, such as at handle portion 3. Thus, the combined scraper and standard will scrape ice from automobile windows, locate an automobile when mounted on its antenna, and serve as a readily noticeable advertisement for the distributor.

FIGURE 2 illustrates an alternate construction of the combined scraper and standard, in which primed reference characters designate elements which correspond to those of the article illustrated in FIGURE 1. This construction of the combined scraper and standard differs from the construction illustrated in FIGURE 1 in that the ridge is replaced by aligned depressed portions 11 and raised portions 12 formed in the base plate generally parallel to the blade 4', and are offset from the center of area of the base plate. Openings 13 are formed through the base plate between each depressed and raised portion, the portions defining the opposed sides of an elongated pocket. A tab 14 extends from a deformed portion adjacent the side of the base plate into the area of the elongated pocket, and effectively closes one end of it. In the illustrated position, the combined scraper and standard of FIGURE 2 may be mounted on an automobile antenna by passing the outer end portion of the antenna through openings 13 and along the depressed and raised portions, the outer end of the antenna abutting against the lower surface of tab 14. As is apparent, the combined scraper and standard illustrated in FIGURE 2 is utilized in a manner similar to the unit illustrated in FIGURE 1. Because the elongated pocket is offset from the center of area of the base plate, the unit will always face into the wind with similar advantages and benefits accruing therefrom.

While a preferred embodiment of the combined scraper and standard has been described, it is to be understood that various modifications within the skill of the art may be made in its details without departing from the scope or spirit of the invention as claimed.

I claim:

1. A combined scraper and standard comprising a base plate, a blade formed at one end portion of the base plate, a handle portion formed at the end portion of the base plate opposite said blade, the base plate including an elongated pocket for receiving the outer end portion of an automobile antenna, said elongated pocket having an axis offset from the center of area of the base plate, the portion of the base plate adjacent the blade being enlarged with respect to the handle, and the elongated pocket being straight, adjacent and generally parallel to the blade and extends substantially through the center of gravity of the base plate.

2. A combined scraper and standard as set forth in claim 1 in which the elongated pocket is formed in a raised hollow ridge on the base plate.

3. A combined scraper and standard as set forth in claim 1 in which the elongated pocket comprises aligned, depressed and raised portions with openings through the base plate therebetween, and a tab attached to the base plate and extending substantially across one end of the pocket.

4. A combined scraper and standard comprising, in combination with a base plate including a blade formed at one end portion and a handle portion formed at the end portion of the base plate opposite said blade, the improvement comprising a base plate including an elongated pocket offset from the center of area of the base plate for receiving the outer end portion of an automobile antenna, said pocket being adjacent and generally parallel to the blade extending substantially through the center of gravity of the base plate, the portion of the base plate adjacent the blade being enlarged with respect to the handle portion.

5. A combined scraper and standard as set forth in claim 4 in which the elongated pocket comprises a ratsed hollow boss formed on the base plate.

6. A combined scraper and standard as set forth in claim 4 in which the elongated pocket comprises aligned depressed and raised portions with openings through the base plate therebetween, and a tab attached to the base plate and extending substantially across one end of the elongated pocket.

References Cited by the Examiner

UNITED STATES PATENTS

| 2,329,046 | 9/1943 | Halbig | 116—173 |
| 2,676,348 | 4/1954 | Brody et al. | 15—105 |
| 2,719,316 | 10/1955 | Hauser | 15—236 |
| 3,107,648 | 10/1963 | Lundstrom | 116—173 |

CHARLES A. WILLMUTH, *Primary Examiner.*

WALTER A. SCHEEL, *Examiner.*